US009773407B2

(12) United States Patent
Eyer et al.

(10) Patent No.: US 9,773,407 B2
(45) Date of Patent: Sep. 26, 2017

(54) SYSTEM AND METHOD FOR TERRESTRIAL BROADCAST OF EMERGENCY ALERTS

(75) Inventors: Mark Eyer, Woodinville, WA (US); Robert Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 12/560,271

(22) Filed: Sep. 15, 2009

(65) Prior Publication Data

US 2010/0075591 A1 Mar. 25, 2010

Related U.S. Application Data

(60) Provisional application No. 61/192,521, filed on Sep. 19, 2008.

(51) Int. Cl.
*H04N 7/025* (2006.01)
*G08B 27/00* (2006.01)
*H04H 20/59* (2008.01)

(52) U.S. Cl.
CPC ........... *G08B 27/008* (2013.01); *H04H 20/59* (2013.01)

(58) Field of Classification Search
USPC ............................................................ 725/33
See application file for complete search history.

(56) References Cited

U.S. PATENT DOCUMENTS

| | | | | |
|---|---|---|---|---|
| 6,775,257 | B1 * | 8/2004 | Watanabe | 725/31 |
| 2003/0204853 | A1 * | 10/2003 | Fries | H04N 5/4401 725/93 |
| 2005/0229207 | A1 * | 10/2005 | Kendall | H04H 60/13 725/33 |
| 2006/0242683 | A1 * | 10/2006 | Medford et al. | 725/139 |
| 2007/0094680 | A1 * | 4/2007 | Kim et al. | 725/33 |
| 2007/0107009 | A1 | 5/2007 | Kim et al. | |
| 2008/0085695 | A1 | 4/2008 | Vare et al. | |
| 2008/0120645 | A1 | 5/2008 | Yun et al. | |
| 2008/0216113 | A1 | 9/2008 | Yun et al. | |
| 2009/0235305 | A1 * | 9/2009 | Pugel | 725/33 |

(Continued)

FOREIGN PATENT DOCUMENTS

| | | | | |
|---|---|---|---|---|
| KR | 10-2007-0043400 A | | 4/2007 | |
| KR | 10-2007-0113509 A | | 11/2007 | |
| KR | 2007113509 | * | 11/2007 | H04N 21/43 |

OTHER PUBLICATIONS

Korean Intellectual Property Office, Office Action issued on May 6, 2013 for corresponding South Korean Patent Application No. 10-2009-87983 English translation (pp. 1-4), pending claims (pp. 5-10) and original office action in Korean (pp. 11-14) pp. 1-14.

*Primary Examiner* — Fernando Alcon
(74) *Attorney, Agent, or Firm* — Haverstock & Owens LLP

(57) ABSTRACT

Systems and methods are disclosed for broadcasting and receiving a terrestrial broadcast signal containing emergency alert information in machine-readable format. The method includes the steps of scanning a Transport Stream associated with the terrestrial broadcast signal. The Transport Stream contains one or more Transport Stream packets and a plurality of tables, which are parsed to identify a channel having a type specified as containing emergency alert information. An MPEG-2 program having said emergency alert information may then be acquired for delivery through a terrestrial broadcast receiver.

22 Claims, 6 Drawing Sheets

(56) References Cited

U.S. PATENT DOCUMENTS

| | | | | |
|---|---|---|---|---|
| 2009/0252253 | A1* | 10/2009 | Choi et al. | 375/270 |
| 2009/0271818 | A1* | 10/2009 | Schlack | 725/33 |
| 2010/0019899 | A1* | 1/2010 | Zhang | G08B 27/005 340/540 |

* cited by examiner

SYSTEM AND METHOD FOR TERRESTRIAL BROADCAST OF EMERGENCY ALERTS

CROSS-REFERENCE TO RELATED APPLICATIONS

This application claims priority from U.S. provisional application Ser. No. 61/192,521 filed on Sep. 19, 2008, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to emergency alert systems and methods, and more particularly to emergency alert (EA) systems and method for terrestrial broadcast digital television.

2. Description of Related Art

The Advanced Television Systems Committee (ATSC) in the US is currently considering whether or not to define a standard method for transport of EA information for terrestrial broadcast television. This work is in response to various FCC and FEMA activities in recent years to revamp the nation's alert system infrastructure. Other delivery media, such as IPTV and digital cable, have standardized such signaling methods. In cable, ANSI J-STD-042-A Emergency Alert Messaging for Cable is used to signal EA information to consumer devices. In IPTV, the Alliance for Telecommunications Industry Solutions (ATIS) has standardized ATIS 0800012 IPTV Emergency Alert System Metadata Specification. Up to this point, no equivalent standard exists for terrestrial broadcast. There is not currently a standard method for delivery of EAS info in machine-readable form in terrestrial broadcast.

BRIEF SUMMARY OF THE INVENTION

This invention relates to the delivery of Emergency Alert information, such as severe weather warnings, alerts resulting from man-made or natural disasters, national-level alerts coming from the Office of the President, and others, to receiving devices capable of accessing a digital terrestrial broadcast signal. This EA info is delivered in a format that is directly machine readable, unlike the alert information currently sent in the audio/video of terrestrial broadcast television stations, which is embedded in the program audio/video, or in which a limited amount of information is encoded in a modulated audio signal.

The present invention comprises systems and methods for delivery and reception of EAS, and may include one or more of the following: a transport method integrating the EAS service into the present ATSC digital television transport system, management of geographic targeting, delivery of the audio portion of an EA such that receiving devices can store it locally for playback (or replay), and a consumer receiving device using the EA signaling message to create the EA alert tones of FCC Part 11. One or more of the above features preferably use existing functions defined in ATSC and CEA standards.

Viewers of the audio/video content on a particular digital television channel will get all pertinent information about an alert (in audible and visual form) by simply monitoring the live broadcast feed. Thanks to digital video recording (DVR) technology, however, today's receivers may not be presenting a live feed to the viewer—the viewer may be watching a program recorded yesterday, or viewing the broadcast channel through a video delay buffer. In these cases, notification of an emergency will not occur as it should. Delivery of a terrestrial broadcast-based EAS notification is very helpful in these cases.

An aspect of the invention is a method for receiving a terrestrial broadcast signal, the signal containing emergency alert information in machine-readable code. The method comprises the steps of scanning a Transport Stream associated with the terrestrial broadcast signal, wherein the Transport Stream contains one or more Transport Stream packets, identifying one or more Transport Stream packets containing emergency alert information, and acquiring one or more Transport Stream packets containing the emergency alert information.

In one embodiment, the Transport Stream packets may be identified by identifying a field in the Transport Stream, the field being designated as being associated with said emergency alert information. In a preferred embodiment, the Transport Stream packets containing emergency alert information are identified by "service type." Alternatively, the Transport Stream Transport Stream packets containing emergency alert information may be identified by one of the following: packet identifier (PID) program number, or mobile/handheld ensemble number, etc.

Generally, each Transport Stream packet comprises a packet header followed by packet data, the packet header comprising one or more fields. A field in the packet header, such as the packet identifier may be designated as being associated with said emergency alert information to aid the receiver in identification of emergency alert packets.

In one embodiment, identifying a field in the Transport Stream comprises parsing data relating to a table contained in the Transport Stream. A channel having a type specified as containing emergency alert information may then be identified to acquire an MPEG-2 program having the emergency alert information.

In a preferred mode, the table comprises a virtual channel table (VCT), and a virtual channel having a "service type" specified as containing emergency alert information is identified. The virtual channel may be identified by service type, wherein the MPEG-2 program is acquired by retrieving one or both of an associated Transport Stream Identifier (TSID) and program number.

In another embodiment, acquiring the MPEG-2 program comprises acquiring a Transport Stream indicated by TSID, acquiring a program association table (PAT) located in the Transport Stream, locating a program within the Transport Stream containing emergency alert information, acquiring the program map table (PMT) associated with said program containing emergency alert information, retrieving a PID value for Transport Stream packets containing emergency alert information, the PID value being stored in the PMT, and retrieving emergency alert data from the identified Transport Stream packets.

In another embodiment, the method further includes responding to the emergency alert information contained in the acquired Transport Stream packets, and displaying an emergency alert message corresponding to said emergency alert information. An audio stream corresponding to the emergency alert information may also be generated.

Another aspect is a receiver for receiving a terrestrial broadcast signal having a Transport Stream containing emergency alert information in machine-readable code. The receiver includes a tuner for tuning to the RF-modulated waveform comprising a terrestrial broadcast signal, a demodulator for demodulating the tuned signal, and a software module configured to parse demodulated Transport Stream packets in said Transport Stream, wherein the software module is configured to identify one or more Transport Stream packets containing emergency alert information and acquire one or more Transport Stream packets containing the emergency alert information.

In one embodiment, the software module is configured to identify a field in the Transport Stream, the field being designated as being associated with said emergency alert information.

In a preferred mode, the software module may include code configured to identify the Transport Stream packets containing emergency alert information by service type. Alternatively, the software module is further configured to identify the Transport Stream packets containing emergency alert information by one or more of the following: PID, program number, or mobile/handheld ensemble number.

In another embodiment, the software module may comprise code configured to identify a field in the Transport Stream by parsing data relating to tables in the Transport Stream such as the VCT, identify a virtual channel (e.g. by service type) having a type specified as containing emergency alert information; and acquiring an MPEG-2 program having emergency alert information (e.g. by associated TSID and program number).

The software may further include code for responding to the emergency alert information contained in the acquired Transport Stream packets; and code for displaying an emergency alert message and/or generating an audio stream corresponding to said emergency alert information.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1A through FIG. 6. It will be appreciated that the apparatus may vary as to configuration and as to details of the parts, and that the method may vary as to the specific steps and sequence, without departing from the basic concepts as disclosed herein.

This description detailed below contains symbolic references to syntactic elements used in the audio, video, and transport coding subsystems. These references are typographically distinguished by the use of a different font and may contain the underscore character (e.g., program_number) and may consist of character strings that are not English words.

Figure 1A:
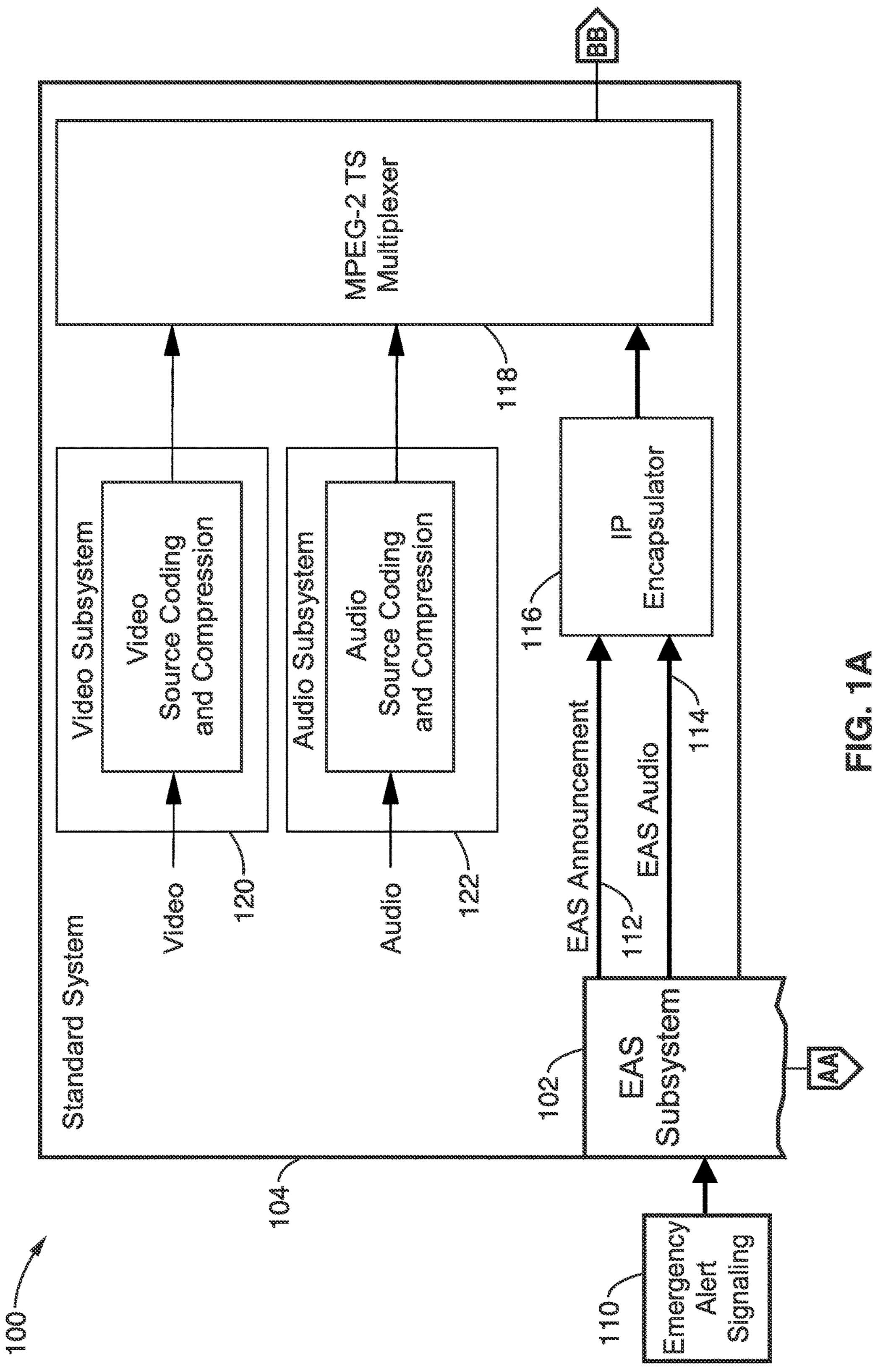
FIGS. 1A and 1B illustrate an EAS compatible terrestrial broadcast receiver configured to receive a terrestrial broadcast from an EAS compatible ATSC broadcast system in accordance with the present invention
Figure 1B:
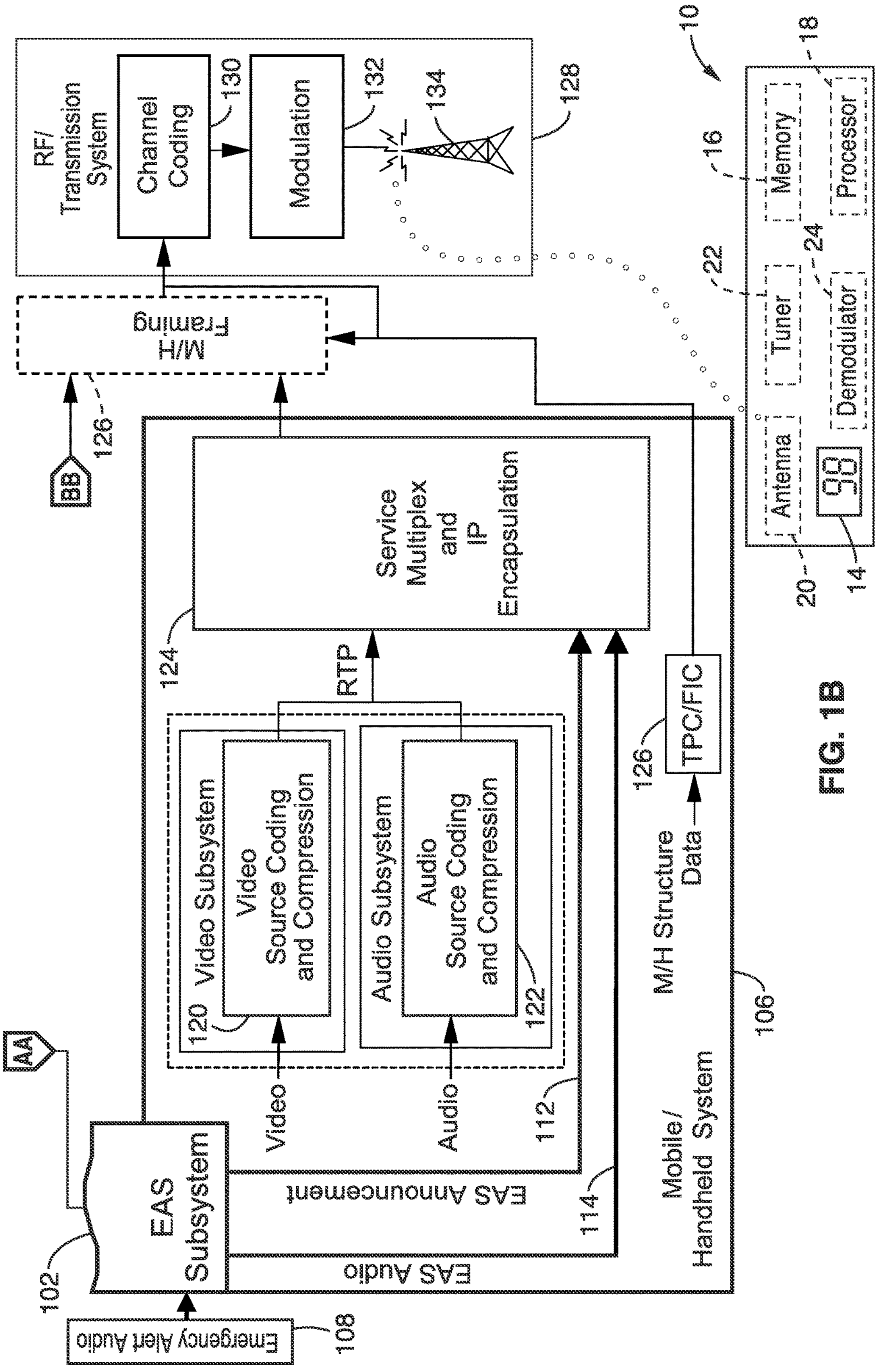

FIGS. 1A and 1B illustrate an EAS compatible terrestrial broadcast receiver 10 configured to receive a terrestrial broadcast from an EAS compatible ATSC broadcast system 100 in accordance with the present invention. EAS compatible ATSC broadcast system 100 comprises an EAS subsystem 102 for receiving EA signaling 110 and EA audio 108. The EAS compatible ATSC broadcast system 100 includes standard/fixed (TS Main) system 104 and Mobile Handheld (M/H) system 106. The ATSC M/H service generally shares the same RF channel as a standard ATSC broadcast service described in ATSC A/53 [30]. M/H is enabled by using a portion of the total available ~19.4 Mbps bandwidth and utilizing delivery over IP transport.

In the fixed system 104, the EAS subsystem 102 outputs an EAS announcement 112 and EAS audio 114 to an IP encapsulator 116. The output of the IP encapsulator 116, along with compressed video 120 and audio 122 is then multiplexed at TS multiplexer 118 for MPEG-2 transport.

In the M/H system 106, the EAS subsystem 102 outputs an EAS announcement 112 and EAS audio, along with compressed video 120 and audio 122, directly to service multiplex and IP encapsulator 124. The output of the IP encapsulator 124 is then directed to M/H framing 126. At RF transmission system 128, the signal then undergoes channel coding 130 and modulation 132 before being broadcast at 134.

The EAS compatible terrestrial broadcast receiver unit 10 includes an antenna 20 for receiving the terrestrial broadcast signal, a terrestrial broadcast signal tuner 22 for tuning to a specific channel upon receipt of a signal received by the antenna 20, and a demodulator 24 for demodulating a tuned signal from the tuner 22 (e.g. by 8-VSB modulation) to output an MPEG-2 Transport Stream. A demultiplexer (not shown) is also included for separating the Transport Stream into a digitally compressed video signal and a digitally compressed audio signal. The receiver 10 also comprises memory for storing programming, and software, and a processor 18 for running the applications, including EAS compatible software.

Figure 2:
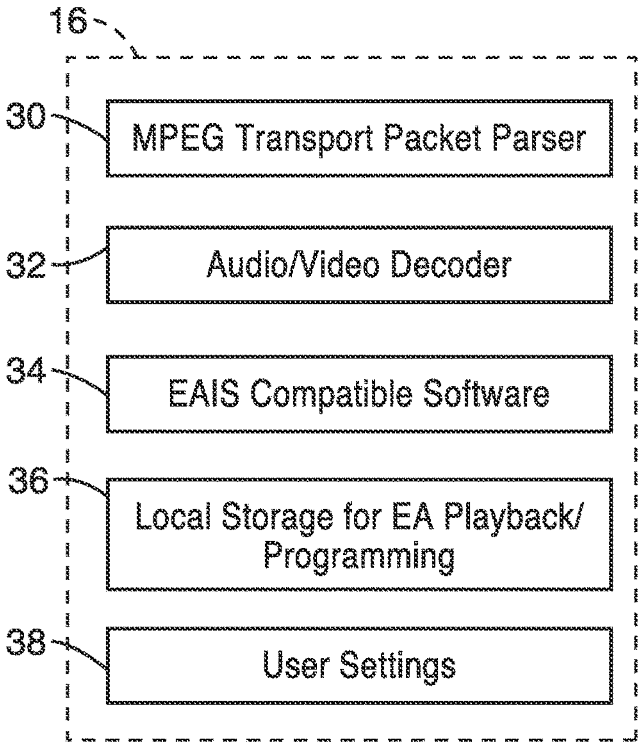
FIG. 2 is a schematic view of a memory module allocated for use in an EAS compatible receiver in accordance with the present invention.

FIG. 2 illustrates memory 16, allocated for various modules such as an MPEG-2 transport packet parser 30, which receives the MPEG Transport Stream and selects video, audio or services information packets, audio/video decoder 32 for processing the MPEG audio stream and producing an analog audio signal and decompressing the MPEG video and generating a video sequence, and other EAS compatible software 34 configured to receive an EAS signaling message. Memory 16 may also be allocated for local storage and EA playback/programming 36, and user settings 38, and the like.

Figure 3:
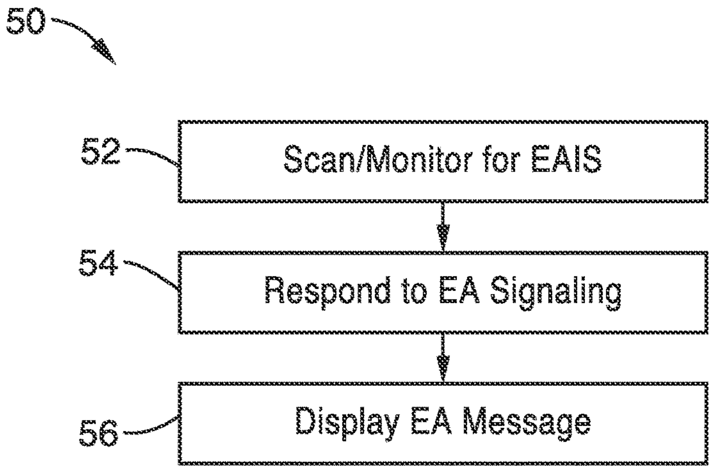
FIG. 3 illustrates an exemplary EAS reception method in accordance with the present invention.

FIG. 3 illustrates an exemplary EAS reception method 50 that may be part of EAS compatible software 34 in the receiver 10. At step 52, the EAS compatible software application or module 34 would scan the MPEG-2 Transport Stream to discover an EAIS (Emergency Alert Information Service). In a preferred embodiment utilizing service type (explained in further detail below with reference to FIG. 4), the software 34 would scan the Virtual Channel Table 180 (VCT) (refer to FIG. 6 below) and discover an EAIS (by its Service Type, e.g. 0x09). Once an EAIS is found, the software 34 could then monitor the stream for events of interest, and notify the viewer as appropriate. Or, if the receiver had a special function called "Emergency Alert Status" or something similar, it could use the EAIS to create an informational screen when that special function were called up by the viewer.

Once an EA signaling message is identified, the software 34 may respond to the Ea signaling message at step 54. The EA signaling message can trigger a variety of behaviors in the terrestrial broadcast receiver 10. For example, the receiver 10 may display text, play a predetermined audio message, or both at step 56. Alternatively, if the channel was being viewed on a delayed basis through a video delay buffer, the receiver could switch to the live signal during the duration of the alert. The text message may be overlayed over an existing program image, or be an entirely new screen specifically dedicated to the emergency alert message.

In one embodiment, the receiver 10 may be configured to respond in accordance with CEA-2009-A Receiver Performance Specification for Public Alert Receivers. The CEA-2009-A standard specifies required behavior of receiving devices designed to receive NOAA All-Hazards Radio transmissions in the range 162.400 MHz to 162.550 MHz.

While terrestrial broadcast television signals are required to include, in audio and visual format, emergency alert information, there is motivation to also include EA information in machine-readable format. In one mode, the broadcast may being viewed on a delayed basis, via a DVR's video delay buffer or memory 16, or the receiver may be playing previously-recorded material at the time of the alert. The receiver 10 may offer a feature whereby a viewer can re-play the textual or audio portion of the alert if they would like to hear it again. In addition, the receiver 10 may be configured so that visually impaired viewers may have control over the size of the displayed text (which they can accomplish if the text is rendered locally, under their control, from information provided in the EA signaling message).

Some EA information may be transmitted in the signaling message that the broadcaster does not feel warrants interruption of program audio and video, yet that information may prove to be of interest to some viewers. Sending it in the separate stream allows the viewer's receiver 10 to make the decision as to whether it reaches the level needed to interrupt regular programming (e.g. via the user preferences or setting 38). A receiver monitoring an EA feed can be designed to trigger attention-getting behavior (such as ringing a bell or shaking the bed) when certain types of alerts are received.

The transport format for EA text may use a similar delivery format as digital advanced closed caption data defined in CEA-708-D (or latest revision). This would allow some amount of formatting on the part of the text author, allow for choice of colors, fonts, and location on the screen, etc.

The receiver 10 may also be programmed to give viewers the option, by interacting with the display device, of slowing down, pausing, or even repeating the display of the EA material. This would give slower readers a chance to comprehend the nature of the alert.

For EA data delivered as a 708-caption stream, the standard could specify a pointer or reference to an Elementary Stream (ES) component (of an MPEG-2 program) carrying the captioning data.

Figure 4:
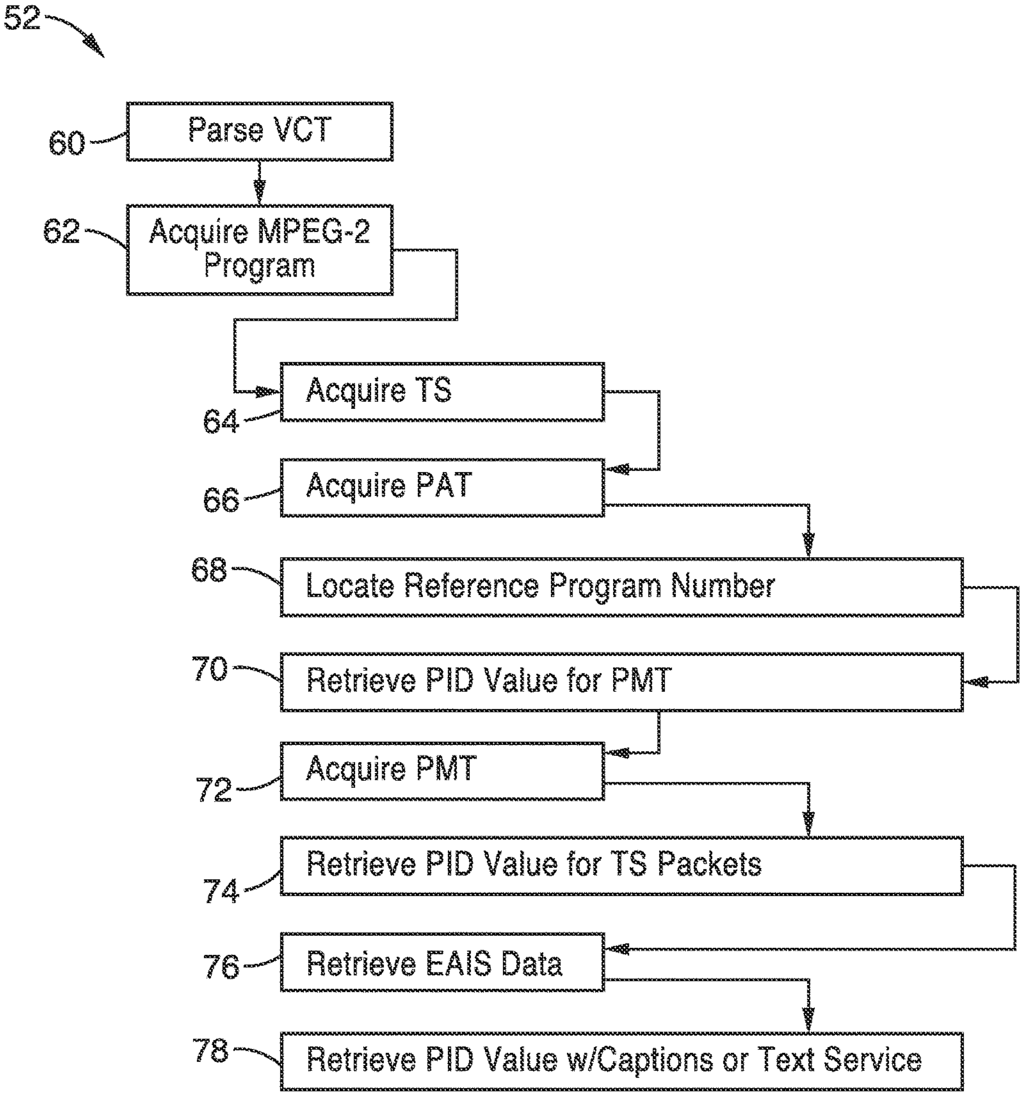
FIG. 4 illustrates a method 52 for scanning for an EAIS via the Service Type concept.

FIG. 4 illustrates a method 52 for scanning for an EAIS via the Service Type concept.

In the current ATSC M/H system, Service Type is used to indicate types of services, such as digital television service, audio-only service, data-only service, and software download service. Service Type is a 6-bit field in the A/65 Virtual Channel record associating a given major/minor channel number with a service that might be offered to the viewer. If a receiver does not recognize or support a certain type of service (based on the value of the Service Type field), that Virtual Channel will not be offered (made visible as a choice) to the viewer.

In the ATSC system, virtual channels are entities corresponding to a user's view (or a software application's view) of services available on a given transport multiplex. For typical DTV channels, the virtual channel record provides the channel name and number, and the physical location of the service (Transport Stream ID and MPEG-2 program_number). Viewers can "channel surf" using the Virtual Channel Table and have the receiver skip over any unsupported or unrecognized services. Service Type 0x05, for example, corresponds to a Software Download service (as defined in the ATSC A/97 standard). A Virtual Channel of Service Type 0x05 would be skipped while channel surfing, but the receiver's software application 34 may scan for and acquire such a service to obtain a firmware or software code update.

In the method of the present invention, the Emergency Alert Information Service (EAIS) may be offered to viewers of digital television by assigning it a standard value of Service Type, such as the value 0x09. A new ATSC standard could establish that Service Type value 0x09 indicates an Emergency Alert Information Service.

As explained above in FIG. 3, the EAIS compatible software application 34 would scan the VCT 180 and discover an EAIS (by its Service Type 0x09). It could then monitor the stream for events of interest, and notify the viewer as appropriate.

Referring back to FIG. 4, an exemplary method 52 may be programmed in the receiver 10 to find TS packets containing EAIS information for the Service Type method. To further illustrate the method 52 of FIG. 4, the Transport Stream 150 is further shown in FIG. 5, and the interrelationships between the various tables found in the Transport Stream 150 are illustrated in FIG. 6.

First, the application 34 would Parse the VCT 180 (FIG. 6) to find a Virtual Channel 182 of type EAIS (0x09 for example) at step 60. At step 62, it would retrieve the associated TSID 188 and program_number 190. At step 64, it would then acquire the MPEG-2 program indicated by TSID 188 and program_number 190.

In a preferred embodiment, acquiring the MPEG-2 program includes a plurality of steps. First, the Transport Stream (TS) 150 indicated by TSID 188 is acquired at step 64 (which may involve re-tuning to a different RF carrier). The TS 150 is a sequence of 188-byte packets, each with a 4-byte header followed by 184 bytes of packet data. The 4-byte header includes a number of fields, (Packet ID, payload unit start indicator, adaptation field flags, Continuity Counter index, etc.) that will allow the transport packet parser to do a coarse filter. The Packet ID, or PID, a 13-bit number used to group packets in the TS 150. It is the label used by the demultiplexer in the decoder 32 to collect all the parts of a given program element for decoding. A PID can be associated with TS packets carrying PES packet data, SI/PSI or table section data, or private data that may be any type including neither of the two. The process by which a decoder 32 extracts TS packets with a given PID value is called PID filtering. The choice of what PID values to use for transport of audio, video, or data is quite flexible, as the 13-bit number space covers 8,192 values. Certain PID values, however, are reserved for special uses or have been reserved by standards bodies for future assignment.

Figure 5:
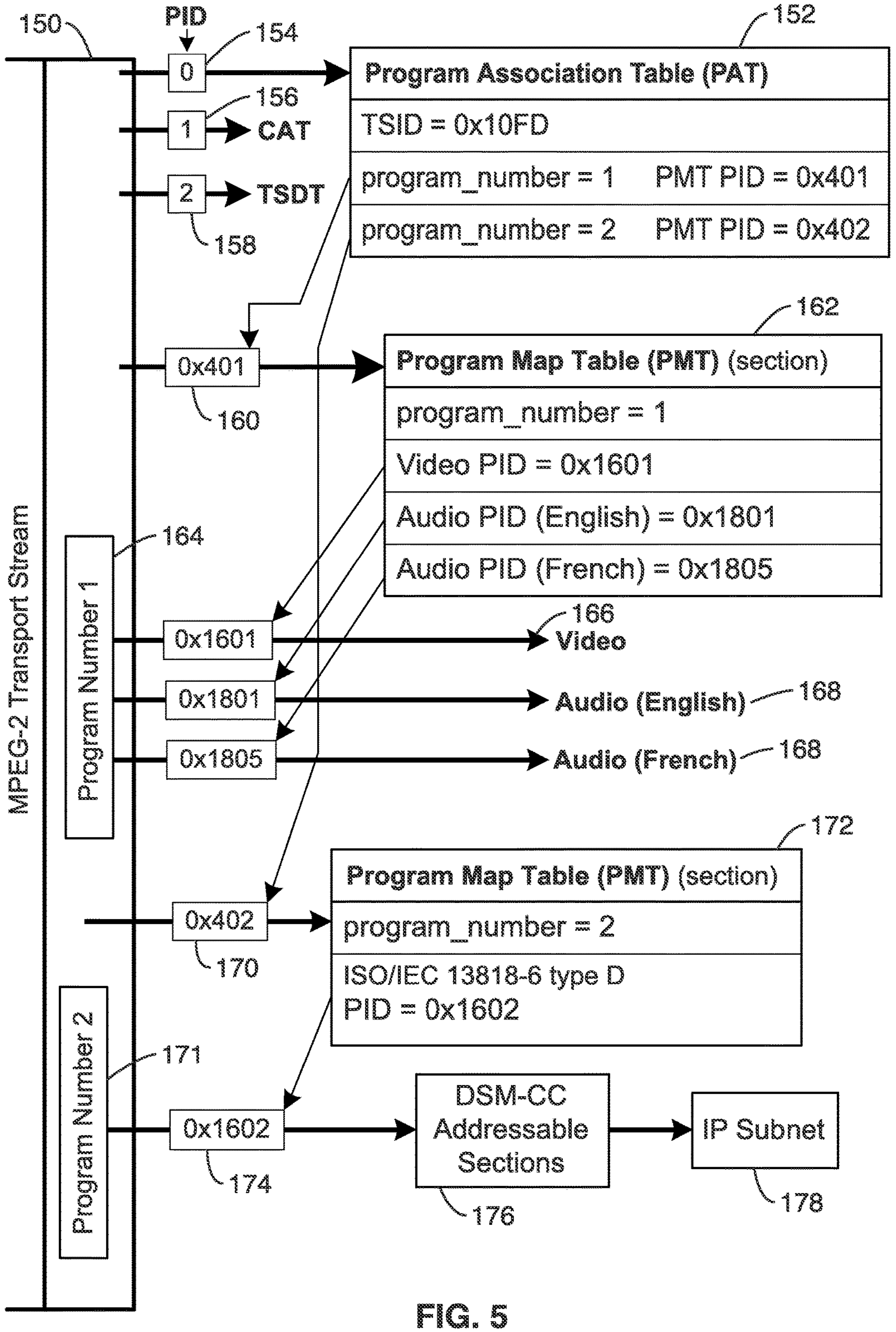
FIG. 5 shows an MPEG-2 Transport Stream in accordance with the present invention.
Figure 6:
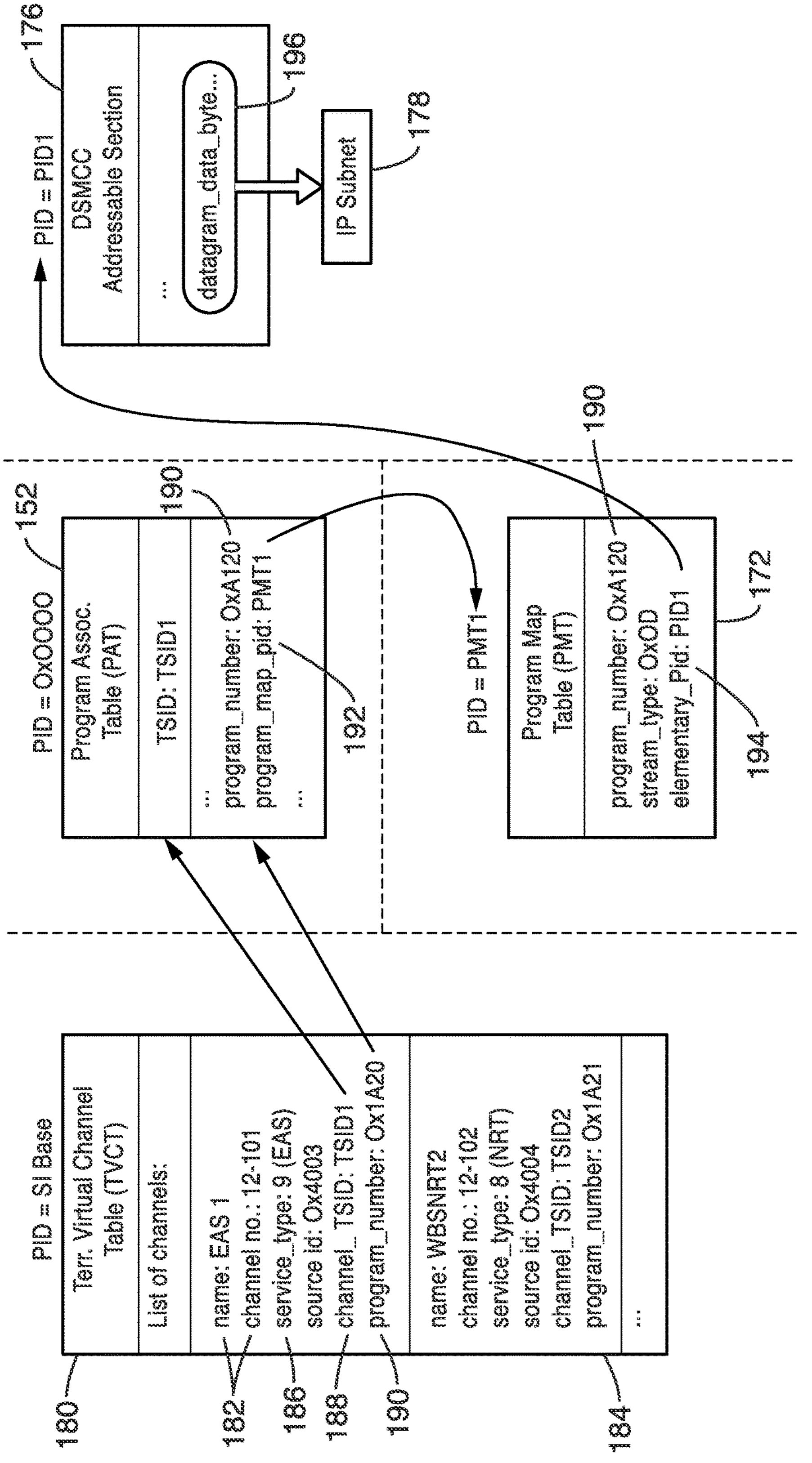
FIG. 6 is a flowchart illustrating the interrelationships between various tables found in the Transport Stream of FIG. 5.

The MPEG-2 TS 150 is also further illustrated in FIG. 5. The full Transport Stream 150 is depicted as a large pipe. Emanating from that pipe are streams composed of TS packets (e.g. 154, 156, and 158) with common PID values. Specific PID values are labeled in the small rectangular boxes (e.g. 0, 1, 2, 0x401). Each of the two MPEG-2 programs 164, 166 in the example is also depicted as a pipe to show that a program is a grouping of related streams. In the example, the first program 164 is composed of three Elementary Stream components: an MPEG-2 video stream 166, and English and French audio tracks 168. The second program 171 is the EAS program carrying the emergency alert. This program 171, identified by PMT 172, only carries one elementary stream component 174, including the DSM-CC addressable sections for IP subnet 178.

Next, the Program Association Table (PAT) 152 is acquired at step 66. The PAT 152 provides pointers in the form of PID and program_number 190 values to one or more sections of the Program Map Table (PMT) 162 or 172. In the present example, the second program 166 carrying the EAS is identified by PMT 172, and thus will be used below. The PID value gives the Packet Identifier for TS packets carrying the PMT section for this program. Each PMT section lists the program elements, including elementary streams that make up the program, and the PID values associated with TS packets carrying those audio, video, and/or data program elements.

The PAT 152 also gives the Transport Stream ID (TSID) 188 associated with the Transport Stream 150 carrying the PAT itself. Transport Stream ID is a 16-bit identifier for the Transport Stream that is specified to be unique throughout the network of broadcast stations in the US.

The Program Association Table 152 does not describe anything other than the current Transport Stream 150. Only one PAT 152 can appear in any given Transport Stream 150.

Other tables in the TS 150 include the Conditional Access Table (CAT) 156, used to indicate PID values of the elementary streams that are used for delivery of conditional access data in the Transport Stream 150, and the Transport Stream Description Table (TSDT) 158, used for descriptors relevant to the entire Transport Stream. PID value 0x0000 is reserved for TS packets carrying sections of the PAT 152. There is at most one PAT 152 per Transport Stream 150. As mentioned above, the PAT provides pointers, in the form of PID and program_number values, to one or more Program Map Table 162, 172 sections also carried in the Transport Stream 150

At step 68, the referenced program_number 190 is located. Every program in the Transport Stream 150 will generally have a unique MPEG-2 program_number 190. In some systems program_number 190 may be used as a user channel number (such usage may be occurring in some DVB systems in Europe), but in the US, program_number 190 is not intended for consumer use. Its primary purpose is as the link between a program identified in the PAT and an instance of a PMT 172 section describing the program elements making up that program.

At step 70, the PID value 192 (program_map_PID) (see also PID 170 in FIG. 5) for the associated Program Map Table 172 is retrieved.

At step 72, the designated PMT 172 is then acquired. Each PMT section defines a programming service in terms of the component parts making up that service, and gives the types of each stream along with the Transport Stream PID values used to transport them in the packet multiplex. The PMT section syntax provides powerful flexibility in that it can include one or more descriptors pertinent to the program as a whole or to specific program elements comprising the service. Both MPEG-2 Systems and the ATSC Digital Television System Standards have defined several descriptors for carriage in the PMT section.

At step 74, the PID value 174 for the TS packets containing EAIS information is retrieved. At step 76, the EAIS data from the referenced TS packets is retrieved. Optionally, at step 78, a PID value associated with a caption and/or text service and/or audio service containing EA information may be retrieved. Alternatively, the TS packets themselves contain EA information, for example in the form of an XML instance document.

In addition to the service type approach detailed above, other methods of signaling or announcing the presence of an EAIS are also possible at step 52.

In one embodiment where transport methods employing the MPEG-2 Transport Stream are used, a standards body could establish a well-known value for Packet Identifier (PID) as being the one carrying the EAIS.

Alternatively, a well-known program_number may be used to signal or announce the presence of an EAIS. This method reserves a special value for MPEG-2 program_number (as defined in ISO/IEC 13818-1 MPEG-2 Systems). In this method, the receiver 10 would parse the Program Association Table (PAT) 152 looking for the pre-specified value. The PAT 152 would indicate the PID value where the Program Map Table (PMT) 172 for the EAIS is found. That PMT 172 would indicate the PID carrying packets containing EAIS information.

In another embodiment, a well-known MH-Ensemble number may be used for transmissions in ATSC Mobile/Handheld.

In another embodiment, delivery of EA Signaling may be achieved via Non-Real Time (NRT) services. NRT services are those involving a) signaling that a piece of audio/video content is available for download; and b) providing audio/ video objects (files) via the broadcast medium to receivers. A Non-Real Time Information Table (NRT-IT) may be used to list pieces of content available for download, and their physical location in the multiplex. A NRT-type service could be defined in which the associated audio/video (and/or text) object(s) relate to Emergency Alert events.

The software 34 of receiver 10 may be configured to monitor the Transport Stream 150 for new entries in the NRT-IT describing such an EA service. Following the pointer in the NRT-IT would yield the EA signaling message, and associated text, audio or audio/video content. By following other pointers in the NRT-IT for the EA service, information on other (still active) events may be downloaded. This technique (signaling when an updated file is available) can also be used for services like current weather forecasts, and freeway traffic congestion map updates.

The software 34 of receiver 10 may be configured management of geographic targeting. For example, some alert messages may only be of relevance to certain viewers in particular geographic locations (e.g. severe weather alerts, etc.). In one embodiment, portions of the CAP standard (Common Alerting Protocol, v. 1.1, OASIS Standard CAP-V1.1, October 2005), which was designed for the Internet, may be configured for use with the EAS compatible system of the present invention to provide targeted delivery and reception of emergency alerts The present invention contemplates the following usages:

1) The application of the Service Type concept to EAS signaling.

2) The adaptation of the EAS signaling schema defined in ATIS 0800012 to the area of terrestrial broadcast 3) The use of IP protocols to deliver EAS signaling and audio information; for regular DTV this would entail delivery of IP packets within the MPEG-2 Transport Stream. For ATSC Mobile/Handheld, it would involve delivery of IP packets as a standard data channel.

4) Adaptation of general signaling and announcement concepts to the EAS service. These include use of virtual channels, service types, PID usage, etc.

5) Receiver response to a terrestrial broadcast EA announcement involving automatically turning on a text display to convey the EA message or automatically switching to a live feed.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A method for receiving a terrestrial broadcast signal, the signal containing emergency alert information in machine-readable code, the method comprising: scanning a Transport Stream associated with the terrestrial broadcast signal; said Transport Stream containing one or more Transport Stream packets; identifying one or more Transport Stream packets containing emergency alert information; and acquiring one or more Transport Stream packets containing the emergency alert information.

2. A method as recited in embodiment 1, wherein identifying one or more Transport Stream packets containing emergency alert information comprises identifying a field in the Transport Stream, said field being designated as being associated with said emergency alert information.

3. A method as recited in embodiment 2, wherein the Transport Stream packets containing emergency alert information are identified by service type.

4. A method as recited in embodiment 2, wherein the Transport Stream packets containing emergency alert information are identified by one of the following: PID, program number, or mobile/handheld ensemble number.

5. A method as recited in embodiment 1: wherein each Transport Stream packet comprises a packet header followed by packet data; wherein the packet header comprises one or more fields; and wherein identifying one or more Transport Stream packets containing emergency alert information comprises identifying a field in the packet header, said field being designated as being associated with said emergency alert information.

6. A method as recited in embodiment 5, wherein the field comprises a packet identifier (PID).

7. A method as recited in embodiment 2: wherein the Transport Stream comprises one or more tables; and wherein identifying a field in the Transport Stream comprises: parsing data relating to one of said one or more tables; identifying a channel having a type specified as containing emergency alert information; and acquiring an MPEG-2 program within said channel, the MPEG-2 program comprising said emergency alert information.

8. A method as recited in embodiment 7: wherein the table comprises a virtual channel table (VCT); and wherein identifying a channel comprises identifying a virtual channel having a type specified as containing emergency alert information.

9. A method as recited in embodiment 8: wherein the virtual channel is identified by service type; and wherein the MPEG-2 program is acquired by retrieving one or both of an associated TSID and program number.

10. A method as recited in embodiment 9, wherein acquiring the MPEG-2 program comprises: acquiring a Transport Stream indicated by TSID; acquiring a program association table (PAT) located in the Transport Stream; locating a program within the Transport Stream containing emergency alert information; acquiring the program map table (PMT) associated with said program containing emergency alert information; retrieving a PID value for Transport Stream packets containing emergency alert information, the PID value being stored in the PMT; and retrieving emergency alert data from the identified Transport Stream packets.

11. A method as recited in embodiment 2, further comprising: responding to the emergency alert information contained in the acquired Transport Stream packets; and displaying an emergency alert message corresponding to said emergency alert information.

12. A method as recited in embodiment 11, further comprising: generating an audio stream corresponding to the emergency alert information.

13. A receiver for receiving a terrestrial broadcast signal, the signal comprising a Transport Stream containing emergency alert information in machine-readable code, the receiver comprising: a tuner for tuning to a specific channel upon receipt of a terrestrial broadcast signal; a demodulator for demodulating the tuned signal; and a software module configured to parse demodulated Transport Stream packets in said Transport Stream; wherein the software module is configured to identify one or more Transport Stream packets containing emergency alert information; and acquire one or more Transport Stream packets containing the emergency alert information.

14. A receiver as recited in embodiment 13, wherein the software module is configured to identify a field in the Transport Stream, said field being designated as being associated with said emergency alert information.

15. A receiver as recited in embodiment 14, wherein the software module is configured to identify the Transport Stream packets containing emergency alert information by service type.

16. A receiver as recited in embodiment 15, wherein the software module is further configured to identify the Transport Stream packets containing emergency alert information by one or more of the following: PID, program number, or mobile/handheld ensemble number.

17. A receiver as recited in embodiment 14: wherein the Transport Stream comprises one or more tables; and wherein the software module is configured to identify a field in the Transport Stream by: parsing data relating to one of said one or more tables; identify a channel having a type specified as containing emergency alert information; and acquiring an MPEG-2 program within said channel, the MPEG-2 program comprising said emergency alert information.

18. A receiver as recited in embodiment 17, wherein the table comprises a virtual channel table (VCT); and wherein identifying a channel comprises identifying a virtual channel having a type specified as containing emergency alert information.

19. A receiver as recited in embodiment 18: wherein the virtual channel is identified by service type; and wherein the MPEG-2 program is acquired by retrieving one or both of an associated TSID and program number.

20. A receiver as recited in embodiment 14, wherein the software module further comprises code for responding to the emergency alert information contained in the acquired Transport Stream packets.

21. A receiver as recited in embodiment 20, wherein the software module further comprises code for generating an audio stream corresponding to the emergency alert information.

22. A method for receiving a terrestrial broadcast signal, the signal containing emergency alert information in machine-readable code, the method comprising: scanning a Transport Stream associated with the terrestrial broadcast signal; said Transport Stream containing one or more Transport Stream packets; wherein the Transport Stream comprises one or more tables; parsing data relating to one of said one or more tables; identifying a channel having a type specified as containing emergency alert information; and acquiring an MPEG-2 program within said channel, the MPEG-2 program comprising said emergency alert information.

23. A method as recited in embodiment 22, wherein the table comprises a virtual channel table (VCT); and wherein identifying a channel comprises identifying a virtual channel having a type specified as containing emergency alert information.

24. A method as recited in embodiment 23, wherein the MPEG-2 program is acquired by retrieving an associated TSID and program number.

25. A method as recited in embodiment 24, wherein acquiring the MPEG-2 program comprises: acquiring a Transport Stream indicated by TSID; acquiring a program association table (PAT) located in the Transport Stream; locating a program within the Transport Stream containing emergency alert information; acquiring the program map table (PMT) associated with said program containing emergency alert information; retrieving a PID value for Transport Stream packets containing emergency alert information, the PID value being stored in the PMT; and retrieving emergency alert data from the identified Transport Stream packets.

26. A method as recited in embodiment 23, wherein the virtual channel is identified by service type.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for receiving a terrestrial broadcast signal, the signal containing emergency alert information in machine-readable code, the method comprising:

scanning a transport stream associated with the terrestrial broadcast signal;

said transport stream containing one or more transport stream packets;

identifying one or more transport stream packets containing emergency alert information; and acquiring one or more transport stream packets containing the emergency alert information;

wherein each transport stream packet comprises a packet header followed by packet data;

wherein the packet header comprises one or more fields;

wherein identifying one or more transport stream packets containing emergency alert information comprises identifying a field in the packet header or transport stream, said field being designated as being associated with said emergency alert information; and wherein the transport stream packets containing emergency alert information are identified by one or more of the following packet identifier, program number or mobile/handheld ensemble number, wherein each emergency alert information of said emergency alert information is classified in a plurality of levels, and when the emergency alert information is classified above a threshold level, regular programming is interrupted, wherein the threshold level is determined at a user's receiver, wherein if a channel is viewed on a delayed basis through a video delay buffer, the user's receiver is switched to a live signal during a duration of an alert triggered by the emergency alert information.

2. A method as recited in claim 1, wherein identifying one or more transport stream packets containing emergency alert information comprises identifying a field in the transport stream, said field being designated as being associated with said emergency alert information.

3. A method as recited in claim 2, wherein the transport stream packets containing emergency alert information are identified by service type.

4. A method as recited in claim 2:

wherein the transport stream comprises one or more tables; and wherein identifying a field in the transport stream comprises:

parsing data relating to one of said one or more tables;

identifying said channel having a type specified as containing emergency alert information; and acquiring an MPEG-2 program within said channel, the MPEG-2 program comprising said emergency alert information.

5. A method as recited in claim 4:

wherein the table comprises a virtual channel table (VCT); and wherein identifying said channel comprises identifying a virtual channel having a type specified as containing emergency alert information.

6. A method as recited in claim 2, further comprising:

responding to the emergency alert information contained in the acquired transport stream packets; and displaying an emergency alert message corresponding to said emergency alert information.

7. A method as recited in claim 6, further comprising generating an audio stream corresponding to the emergency alert information.

8. A receiver for receiving a terrestrial broadcast signal, the signal comprising a transport stream containing emergency alert information in machine-readable code, the receiver comprising:

a tuner for tuning to a specific channel upon receipt of a terrestrial broadcast signal;

a demodulator for demodulating the tuned signal; and a software module configured to parse demodulated transport stream packets in said Transport Stream;

wherein the software module is configured to identify one or transport stream packets containing emergency alert information;

wherein the software module is configured to acquire one or more transport stream packets containing the emergency alert information;

wherein each transport stream packet comprises a packet header followed by packet data;

wherein the packet header comprises one or more fields;

wherein identifying one or more transport stream packets containing emergency alert information comprises identifying a field in the packet header, said field being designated as being associated with said emergency alert information; and wherein the transport stream packets containing emergency alert information are identified by one or more of the following packet identifier, program number or mobile/handheld ensemble number, wherein each emergency alert information of said emergency alert information is classified in a plurality of levels, and when the emergency alert information is classified above a threshold level, regular programming is interrupted, wherein the threshold level is determined at a user's receiver, wherein if the channel is viewed on a delayed basis through a video delay buffer, the user's receiver is switched to a live signal during a duration of an alert triggered by the emergency alert information.

9. A receiver as recited in claim 8, wherein the software module is configured to identify a field in the transport stream, said field being designated as being associated with said emergency alert information.

10. A receiver as recited in claim 9:

wherein the transport stream comprises one or more tables; and wherein the software module is configured to identify a field in the transport stream by:

parsing data relating to one of said one or more tables;

identify said channel having a type specified as containing emergency alert information; and acquiring an MPEG-2 program within said channel, the MPEG-2 program comprising said emergency alert information.

11. A receiver as recited in claim 10:

wherein the table comprises a virtual channel table (VCT); and wherein identifying said channel comprises identifying a virtual channel having a type specified as containing emergency alert information.

12. A receiver as recited in claim 9, wherein the software module further comprises code for responding to the emergency alert information contained in the acquired transport stream packets.

13. A receiver as recited in claim 12, wherein the software module further comprises code for generating an audio stream corresponding to the emergency alert information.

14. A method for receiving a terrestrial broadcast signal, the signal containing emergency alert information in machine-readable code, the method comprising:

scanning a Transport Stream associated with the terrestrial broadcast signal; said Transport Stream containing one or more Transport Stream packets;

wherein the Transport Stream comprises one or more tables;

parsing data relating to one of said one or more tables;

identifying a channel having a type specified as containing emergency alert information; and acquiring an MPEG-2 program within said channel, the MPEG-2 program comprising said emergency alert information;

wherein the Transport Stream packets containing emergency alert information are identified by one or more of the following packet identifier, program number or mobile/handheld ensemble number, wherein each emergency alert information of said emergency alert information is classified in a plurality of levels, and when the emergency alert information is classified above a threshold level, regular programming is interrupted, wherein the threshold level is determined at a user's receiver, wherein if the channel is viewed on a delayed basis through a video delay buffer, the user's receiver is switched to a live signal during a duration of an alert triggered by the emergency alert information.

15. A method as recited in claim 14:

wherein the table comprises a virtual channel table (VCT); and wherein identifying said channel comprises identifying a virtual channel having a type specified as containing emergency alert information.

16. A method as recited in claim 15, wherein the MPEG-2 program is acquired by retrieving an associated TSID and program number.

17. A method as recited in claim 14, wherein acquiring transport stream packets comprises acquiring IP packets as a standard data channel.

18. A method as recited in claim 1, wherein acquiring transport stream packets comprises acquiring IP packets as a standard data channel.

19. A receiver as recited in claim 8, wherein acquiring transport stream packets comprises acquiring IP packets as a standard data channel.

20. A method as recited in claim 14:

wherein the emergency alert information comprises an EAS announcement that is sent to a service multiplex and IP encapsulator; and wherein the output of the IP encapsulate is then directed to an M/H framing module to then undergo channel coding.

21. A method as recited in claim 1:

wherein the emergency alert information comprises an EAS announcement that is sent to a service multiplex and IP encapsulator; and wherein the output of the IP encapsulate is then directed to an M/H framing module to then undergo channel coding.

22. A receiver as recited in claim 8:

wherein the emergency alert information comprises an EAS announcement that is sent to a service multiplex and IP encapsulator; and wherein the output of the IP encapsulate is then directed to an M/H framing module to then undergo channel coding.

* * * * *